(12) United States Patent
Sherman et al.

(10) Patent No.: US 7,640,420 B2
(45) Date of Patent: Dec. 29, 2009

(54) PRE-FETCH APPARATUS

(75) Inventors: Marina Sherman, Nesher (IL); Jack Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 11/731,954

(22) Filed: Apr. 2, 2007

(65) Prior Publication Data

US 2008/0244232 A1 Oct. 2, 2008

(51) Int. Cl.
*G06F 9/24* (2006.01)
(52) U.S. Cl. .................... 712/220; 712/213
(58) Field of Classification Search .............. 712/220
See application file for complete search history.

(56) References Cited

U.S. PATENT DOCUMENTS 7,380,066 B2 * 5/2008 Griswell et al. ............ 711/137
7,383,418 B2 * 6/2008 Janik et al. ................ 711/216
2005/0289301 A1 * 12/2005 Woo et al. .................. 711/137

OTHER PUBLICATIONS

Vanderweil, S.P. etal., Data Prefetch Mechanisms, 2000, ACM Computing Surveys, vol. 32,No. 2, pp. 174-199.*
Wenxin Zu, X. F. etal., New prefetch technique design for L2 Cache, 2006, IEEE, 4 pages.*
Wang, K. etal., Highly Accurate Data Value Prediction ushing Hybrid Predictors, 1997, IEEE, pp. 281-290.*

* cited by examiner

*Primary Examiner*—Eric Coleman
(74) *Attorney, Agent, or Firm*—Murthy S.K.

(57) ABSTRACT

Apparatus and computing systems associated with data pre-fetching are described. One embodiment includes a processor that includes a first unit to store data corresponding to a load instruction and an instruction pointer (IP) value associated with the load instruction. The processor also includes a second unit to produce a predicted demand address for a next load instruction, the predicted demand address being based on a constant stride value. The processor also includes a third unit to generate an instruction pointer pre-fetch (IPP) request for the predicted demand address. The processor may also include units to arbitrate between generated IP pre-fetch requests and alternative pre-fetch requests.

14 Claims, 4 Drawing Sheets

PRE-FETCH APPARATUS

TECHNICAL FIELD

Embodiments of the invention relate to the field of microprocessors and computer systems. More particularly, at least one embodiment of the invention relates to an apparatus for issuing a pre-fetch request based on-predicting the address of a load.

BACKGROUND

In computer systems, a central processing unit (CPU) and the memory upon which it relies may operate with different speeds, leading to memory latency issues. Latency issues may be mitigated using, for example, cache memories, pre-fetching apparatus, and so on. Latency issues may be exacerbated in multi-core systems (e.g., simultaneous multithreading system (SMT), chip level multithreading system (CMP)).

Data pre-fetching seeks to improve processor performance by predicting the memory location of required data and bringing it to the CPU ahead of time to avoid delays caused by waiting for a fetch from memory to complete. The efficiency of a pre-fetching apparatus may depend on attributes including, for example, precision of a pre-fetch prediction for a next data location, whether data is to be pre-fetched "just-in-time" for on demand load/store usage, and resolution of conflicts in processor resources between pre-fetch requests and regular requests.

An instruction pointer based pre-fetcher (IPP) uses a technique of data pre-fetching based on the instruction pointer. Some conventional pre-fetchers always pre-fetch (e.g., pre-fetch without history considerations). Other conventional pre-fetchers examine a simple history of locality based patterns to prefetch a next cache line and/or calculate history based on constant differences in a data pattern.

BRIEF DESCRIPTION OF THE DRAWINGS

The accompanying drawings, which are incorporated in and constitute a part of the specification, illustrate various apparatus embodiments and other embodiments of various aspects of the invention. It will be appreciated that the illustrated element boundaries (e.g., boxes, groups of boxes, or other shapes) in the figures represent one example of the boundaries.

DETAILED DESCRIPTION

One embodiment of the invention provides an apparatus for instruction pointer pre-fetching (IPP). In one embodiment, the IPP apparatus uses a load instruction history that includes an annotated history entry concerning a load instruction. The annotation relates a load instruction and the Instruction Pointer (IP) value associated with the load instruction. In one embodiment, the annotation may be processed by a function that indexes into a history array. An IPP apparatus may examine the IP of a load instruction, keep a history including an IP value history on a per load instruction basis, and decide whether to pre-fetch data based on the per load instruction history. The per load instruction history may be stored, for example, in a history array. In one embodiment, the history array may have 256 direct mapped entries in which an entry may exist for any 8 bit hash value of an IP. The history array may also include a valid bit that marks an entry as valid after a first access associated with the indexing IP value. This first access may correspond to a first transition from a reset state to an initial state as described below.

Based on the per load instruction history, in one embodiment the IPP may predict the address of the next load instruction according to a constant stride calculation. In one embodiment, a stride calculation may determine a fixed distance, or "stride", in the virtual address space between subsequent accesses (e.g., load instructions). Accesses (e.g., load instructions) having a constant stride may be found, for example, in code that iterates through an array. In this type of code, a perfect stride access pattern (e.g., $A_n - A_{n-1} =$ Constant) may be experienced and thus the address for the next iteration may be predicted precisely. An IPP request may then be generated with the predicted address which may bring the requested data (e.g. of the cache line containing address $A_{n+1}$), to a level 1 (L1) data cache before that data is actually needed by the incoming stream of instructions. In one embodiment, a stride is not based on IP differences, but rather on different virtual addresses associated with load instructions having the same IP value. Thus, a stride may be calculated as:

Stride=load_new_address−load_old_address.

In one embodiment a first load instruction may be issued, where IP=x and the address to load from is y1. A second load instruction, or a second instance of the first load instruction, may be issued where IP=x and the address to load from is y2. In this example, the stride would equal y2−y1. In some embodiments, loads having the same IP may be issued repetitively. This may occur, for example, in a program loop iterating through a block of memory organized into equal sized entries when allocated, such as in an array.

In one embodiment, the IPP request may be written to a pre-fetch request FIFO (first-in-first-out) buffer. The pre-fetch request may reside in the FIFO until "favorable conditions" come into existence, at which point the pre-fetch request FIFO buffer may issue a pre-fetch request to the L1 cache unit. In one embodiment, a pre-fetch request may then be issued to the L1 cache unit and be removed from the pre-fetch request FIFO when appropriate conditions occur. In one embodiment, selection between requests generated by different prefetchers may occur.

Figure 1:
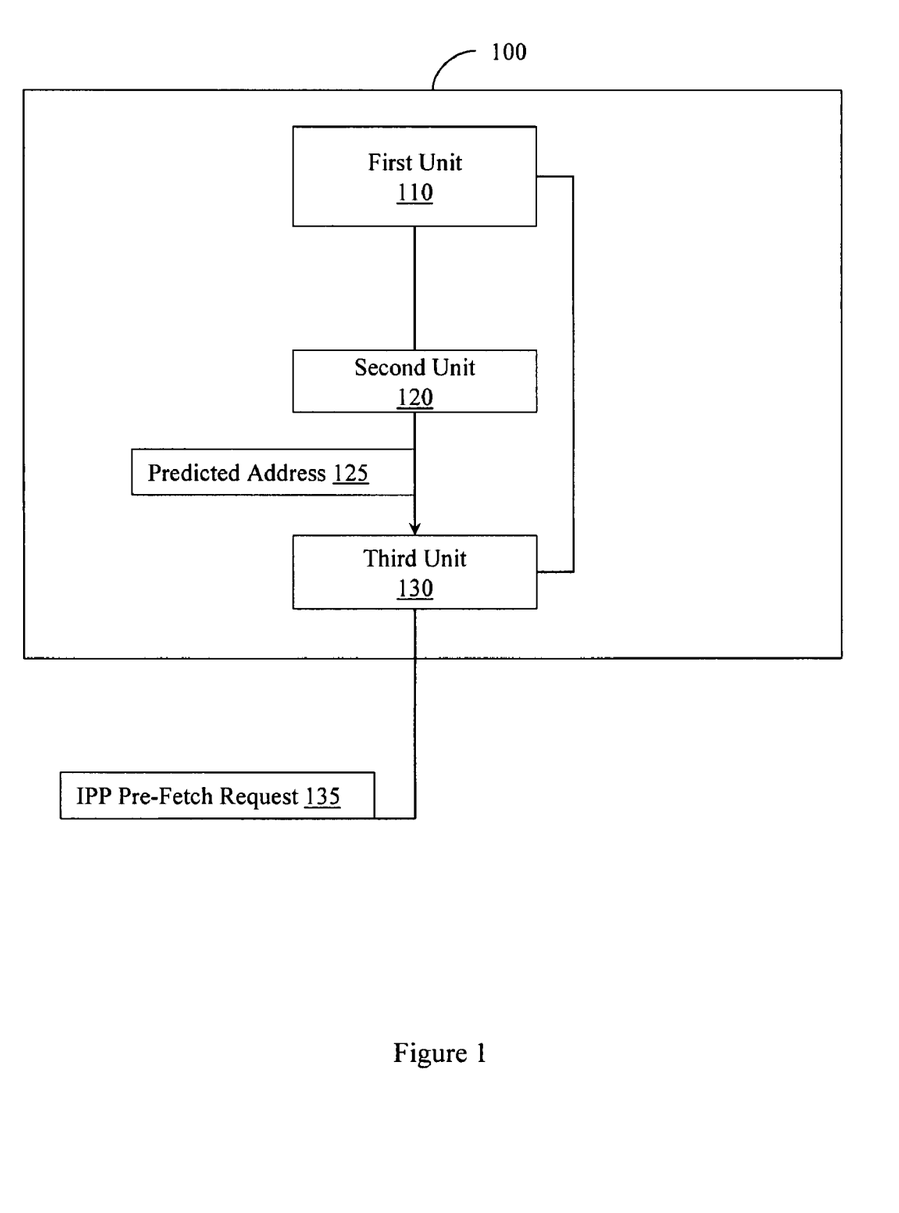
FIG. 1 is a block diagram illustrating processing logic in which at least some aspects of at least one embodiment of the invention may be performed.

FIG. 1 illustrates processing logic to predict addresses associated with load instructions to be used by a processor, according to one embodiment. The processing logic may be used to make data available to a processor before it is required. In one embodiment, the processing logic may be arranged in an apparatus 100. Apparatus 100 may be arranged, in one embodiment, in a processor having a multi-core architecture. Apparatus 100 may also be arranged in a single-core architecture.

Apparatus 100 may include a first unit 110 to store data that corresponds to executed load instructions and to instruction pointer (IP) values associated with executed load instructions. Thus, the first unit 110 may store a per load instruction history. In one embodiment, the first unit 110 may store data including a demand address value, and a stride value in an IP history array on a per load instruction basis. The demand address value and stride value may be used to compute (e.g., predict) the address of a subsequent load instruction.

In one embodiment, an entry in the IP history array may have five fields. The five fields may include a field to store data corresponding to a last demand address and a field to store data corresponding to a last stride value. Thus, historical information concerning previous addresses and previous strides may be available, in one embodiment. The five fields may also include a field to store data corresponding to a linear address that facilitates avoiding pre-fetching across memory pages. Thus, blind pre-fetch attempts that might cross a memory page and have a negative impact are avoided. In one embodiment, an entry in the history array may facilitate apparatus 100 pre-fetching across multiple memory pages. The five fields may also include a field to store data to identify a state in a state machine. The state machine may facilitate continuously predicting addresses and even overlooking one stride miss. In one embodiment, the five fields may also include a field to store data corresponding to a last pre-fetched address that facilitates avoiding redundant pre-fetch requests. Thus, blind pre-fetches that may have a negative impact are further avoided. In one embodiment, the data corresponding to a last stride value may have thirteen bits, twelve bits corresponding to a stride value and one bit corresponding to a stride value sign.

In one embodiment, apparatus 100 may also include a second unit 120 to produce a predicted address 125 for a next load instruction. The predicted address 125 may be based on a constant stride value. The constant stride value may be computed, for example, as the difference between current demand address values and stored previous demand address values associated with the IP of executed load instructions for which data is stored in the first unit 110. Thus, given an address of the most recently executed load instruction and the stride value, the address of the next load instruction may be predicted. In one example, the IP value associated with an executed load instruction may be represented by the eight least significant bits of an IP value or may be a different hash function.

In one embodiment, apparatus 100 may also include a third unit 130 to generate an instruction pointer pre-fetch (IPP) request 135, in one embodiment. In one embodiment, the IPP request 135 may be based on the predicted address 125. As described above, the pre-fetch request 135 may not be a traditional "blind" request that does not account for accesses across page boundaries, redundant requests, and so on.

Figure 2:
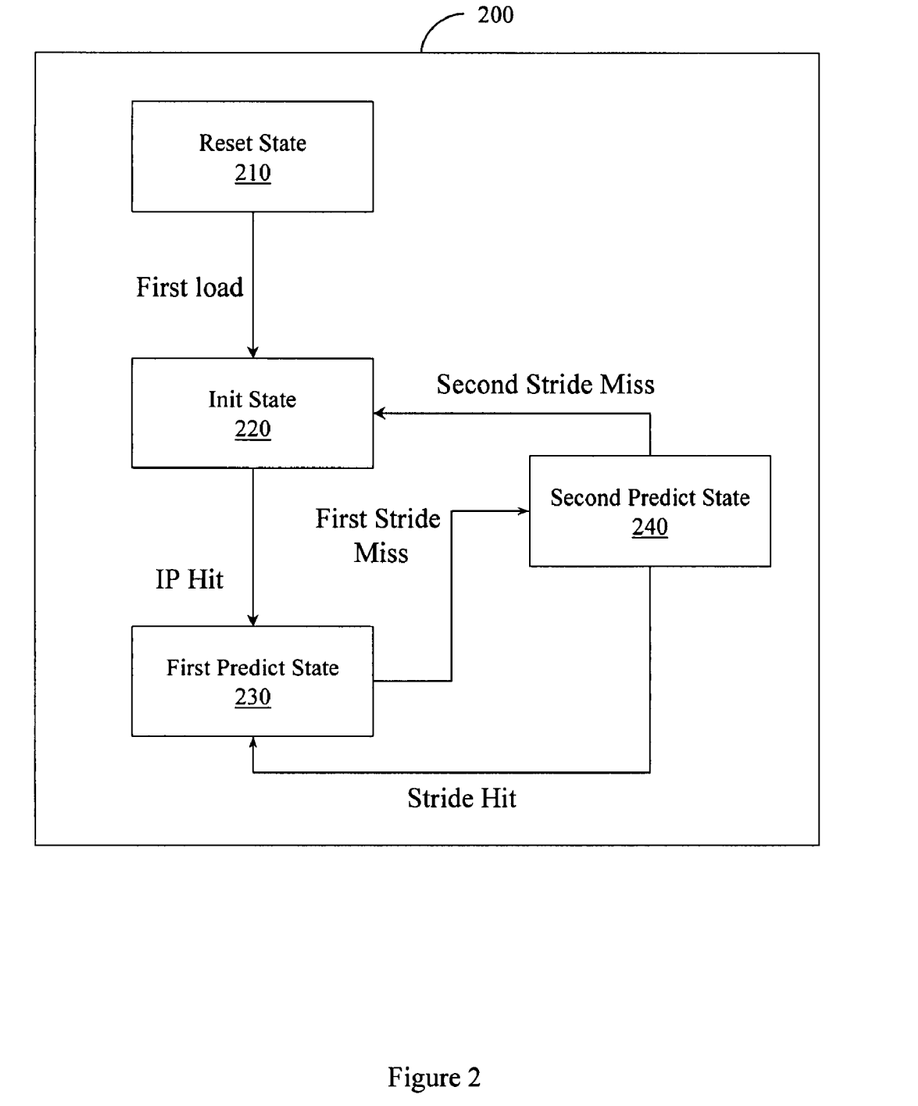
FIG. 2 is a block diagram illustrating a finite state machine associated with at least some aspects of at least one embodiment of the invention.

In one embodiment, processing associated with generating an IPP pre-fetch request 135 may be controlled, at least in part, by a state machine. In one example, an entry in an IP history array may have data corresponding to its own state machine. FIG. 2 illustrates one example of a four-state state machine 200. In one embodiment, the four states in the state machine 200 include, a Reset state 210, an Init state 220, a first predict state 230, and a second predict state 240.

In one embodiment, the Reset state 210 may be a beginning state for the state machine 200, and the Reset state 210 may be a state where a first load will update an entry in the IP history array with, for example, a load instruction IP value. In one embodiment, the Init state 220 may be an initial state where a stride between an executed load instruction and a load instruction to be executed can be calculated. The stride may be calculated upon detecting a load instruction whose IP value matches the IP value of an entry in the IP history array. Thus, if a load instruction has previously executed, an address concerning that load instruction may be available and this address may be used to predict the address of the next load instruction.

In one embodiment, the first predict state 230 may be a state where a pre-fetch request may be generated based on the stride value and the demand address value associated with a previously executed load. The pre-fetch request may be for an address corresponding to a current address plus a stride value. The pre-fetch request may be generated upon detecting a load instruction whose IP value matches the IP value of an entry in the IP history array and upon detecting a stride hit between a new access and an old access. An address and an old stride corresponding to the old access may be available in the IP history array, which may facilitate detecting the IP value match and the stride hit.

In one embodiment, the second predict state 240 may also be a state where a pre-fetch request may be generated. The pre-fetch request may be for an address corresponding to a current demand address plus a stride value. The request may be generated upon detecting both a load instruction whose IP value matches the IP value of an entry in the IP history array and a stride hit between a new access and an old access. Once again address and stride corresponding to the old access may be stored in the IP history array, which facilitates detecting both the IP value match and the stride hit. This second predict state 240 may facilitate forgiving a one time stride miss. A stride miss may occur when an iteration through an array is temporarily affected by, for example, changing from a first column to a second column.

The occurrence of certain events may cause transitions between states in state machine 200. For example, a transition from the Reset state 210 to the Init state 220 may occur when a first load instruction is identified while the state machine 200 is in the Reset state 210. In this way the state machine 200 can wait until a first load occurs before preparing to attempt to predict the address of subsequent loads. A transition from the Init state 220 to the first predict state 230 may occur when a match between an IP value associated with a load instruction and an IP value in the IP history array is detected while the state machine 200 is in the Init state 220. So, when an IP hit occurs, indicating that there is information about a load instruction available, the state machine 200 may enter a state where an address prediction may occur.

In one embodiment, a transition from the first predict state 230 to the second predict state 240 may occur upon a first stride miss while the state machine 200 is in the first predict state 230. Rather than simply stopping predictions, the state machine 200 may facilitate overlooking one stride miss, which facilitates, for example, transitioning back to the start of an inner loop executing inside an outer loop. Therefore, a transition from the second predict state 240 back to the first predict state 230 can happen when a stride match occurs while the state machine 200 is in the second predict state 240. However, if a stride miss occurs while the state machine 200 is in the second predict state 240, then a transition from the second predict state 240 back to the Init state 220 may occur.

Thus, more generally, a reset state is a beginning state. In one embodiment, a first load instruction with a given f(EIP [63:0]) may update the history of a corresponding entry in a load history tracker and transition a state machine to an initial state. A load instruction that hits (e.g., matches) the IP value of an entry in the load history tracker while the state machine is in the initial state may cause the calculation of the stride between the old (e.g., stored) access (e.g., load instruction) and the new (e.g., current) access (e.g., load instruction) and causes a state transition to a first prediction state. A load instruction that hits the IP value of an entry in the load history tracker while the state machine is in the first prediction state may cause a check for a stride hit (a comparison of the stride of the new access to the stride of the previous access). The old stride value may be stored, for example, in the load history tracker. A pre-fetch request to the next predicted address may be generated in case of IP and stride hits. The pre-fetch request will be to an address computed by adding the current address and the stride.

In the embodiment, a first stride miss while the state machine is in the first prediction state may cause a transition to the second prediction state (e.g., Predict' state). Pre-fetches using the old stride value may continue to be generated. These pre-fetch requests will be to an address computed by adding the current address and the old stride. The old stride will be stored in an array entry, while the new stride is ignored. However, a second stride miss may stop the generation of pre-fetch requests and cause a transition to the initial state.

In one embodiment, the second prediction state is intended to forgive a one time deviation from a pattern and to facilitate pre-fetching in stride in the single error case. This second prediction state is useful, for example, for code having nested loops where an internal loop may miss stride once when returning to an external loop. The second prediction state may facilitate continuing pre-fetching in the case of a single pattern deviation, which provides some tolerance for a one time irregularity (e.g., page transition, loop end).

Figure 3:
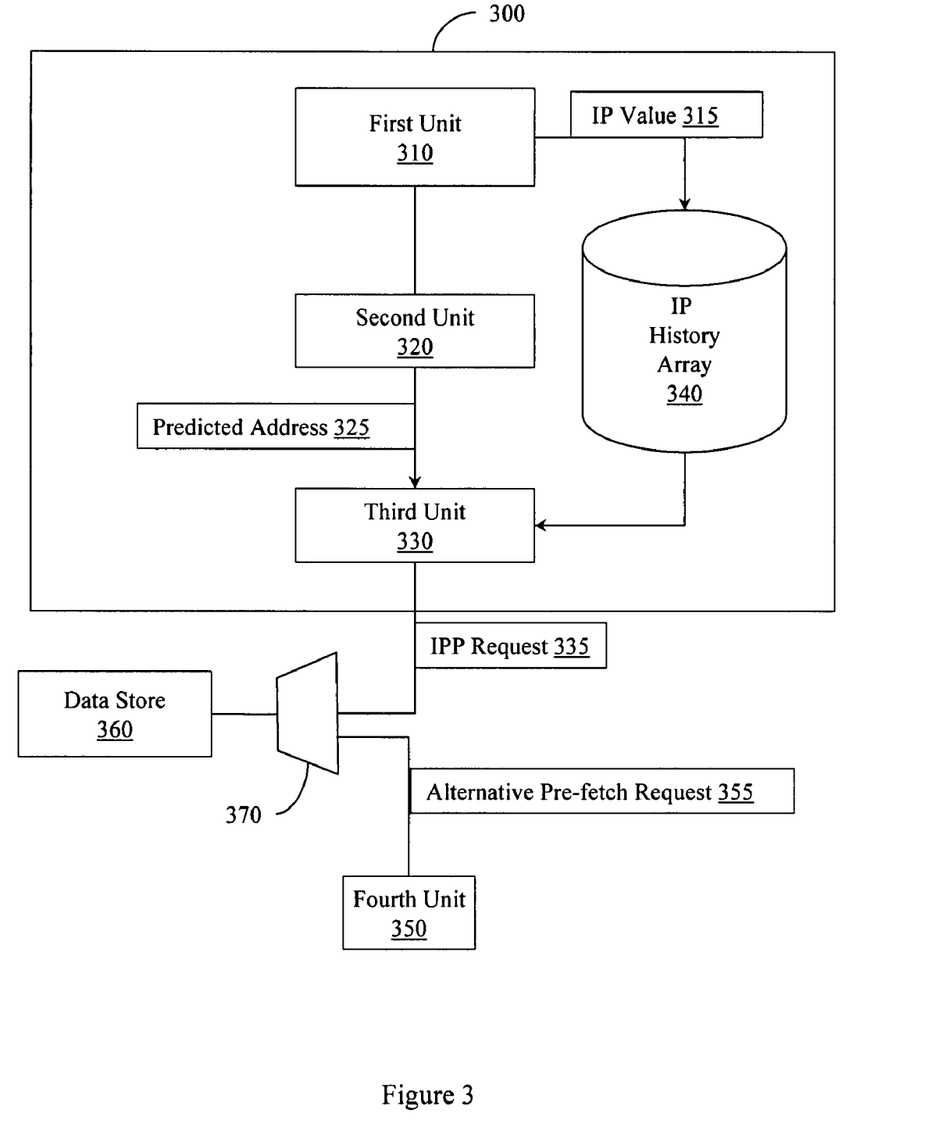
FIG. 3 is a block diagram illustrating processing logic in which at least some aspects of at least one embodiment of the invention may be performed

FIG. 3 illustrates processing logic to predict addresses of load instructions to be used by a processor. The processing logic may request that data be made available to the processor in a manner that facilitates its delivery before it is required. In one example, the processing logic may be arranged in an apparatus 300. Apparatus 300 may be arranged, in one embodiment, in a processor having a multi-core architecture.

In one embodiment, apparatus 300 may include some elements similar to those described in connection with apparatus 100. For example, apparatus 300 may include a first unit 310, a second unit 320, and a third unit 330 that generate a predicted address 325 and that provide a IPP pre-fetch request 335. However, apparatus 300 may include additional elements.

In one embodiment, apparatus 300 may include a fourth unit 350 to generate an alternative pre-fetch request 355 and a fifth unit 370 to select between the IPP request 335 and the alternative pre-fetch request 355. The selection may be necessary because both the IPP request 335 and the alternative pre-fetch request 355 may have been generated in response to the same load instruction. Thus, the fifth unit 370 may control placement of IPP requests and alternative pre-fetch requests into a pre-fetch data store 360. The pre-fetch data store 360 may be, for example, a first in first out (FIFO) data structure. While a single alternative pre-fetch request 355 is illustrated being provided from a single fifth unit 370, it is to be appreciated that apparatus 300 may include a plurality of units that produce a plurality of alternative pre-fetch requests. Fifth unit 370 may select between the pre-fetch requests based on heuristics concerning the accuracy of the unit producing the pre-fetch requests.

In one embodiment, to facilitate having both the IPP request 335 and the alternative pre-fetch request 355 present at the fifth unit 370 during a time period when a selection between them can be made, a processor into which apparatus 300 is incorporated may have request pipes engineered to create this condition. For example, an IPP request associated with a first load instruction may traverse an IPP request pipe in a first period of time to reach the fifth unit at a first point in time. Additionally, an alternative pre-fetch request associated with the first load instruction may traverse an alternative pre-fetch request in a second period of time so that it also reaches the fifth unit at the first point in time. Therefore, related IPP requests and alternative pre-fetch requests related to the same load instruction may be made available to the fifth unit 370 in a period of time during which a decision between them can be made. The period of time may be, for example, a finite set of clock cycles during which pre-fetch requests are collected.

In one embodiment, when presented with both an IPP request and an alternative prefetch request associated with the same load instruction, the fifth unit 370 may preserve the IPP request and discard the alternative request. Additionally, the fifth unit 370 may provide a preserved pre-fetch request to a pre-fetch data store 360 that includes a unit to identify a duplicate pre-fetch request in a set of pre-fetch requests. In one embodiment, the pre-fetch data store 360 may include logic to cancel duplicate pre-fetch requests. In one embodiment, the logic to cancel duplicate pre-fetch requests may compare ten least significant bits of a pre-fetch address associated with a pre-fetch request to pre-fetch addresses stored in the pre-fetch data store 370 to identify duplicates.

In one embodiment, an IPP may share resource allocation and traffic control logic with hardware associated with an alternative L1 data cache pre-fetcher. However, an IPP request may be more accurate than an L1 data cache alternative pre-fetch request generated by another apparatus. The IPP may be a more accurate prediction based on the history array, which keeps history for loads and that can calculate strides up to, for example, plus or minus 2 k sizes. Thus, when related IPPs and alternative pre-fetch requests are present, the IPP request may be preserved.

Figure 4:
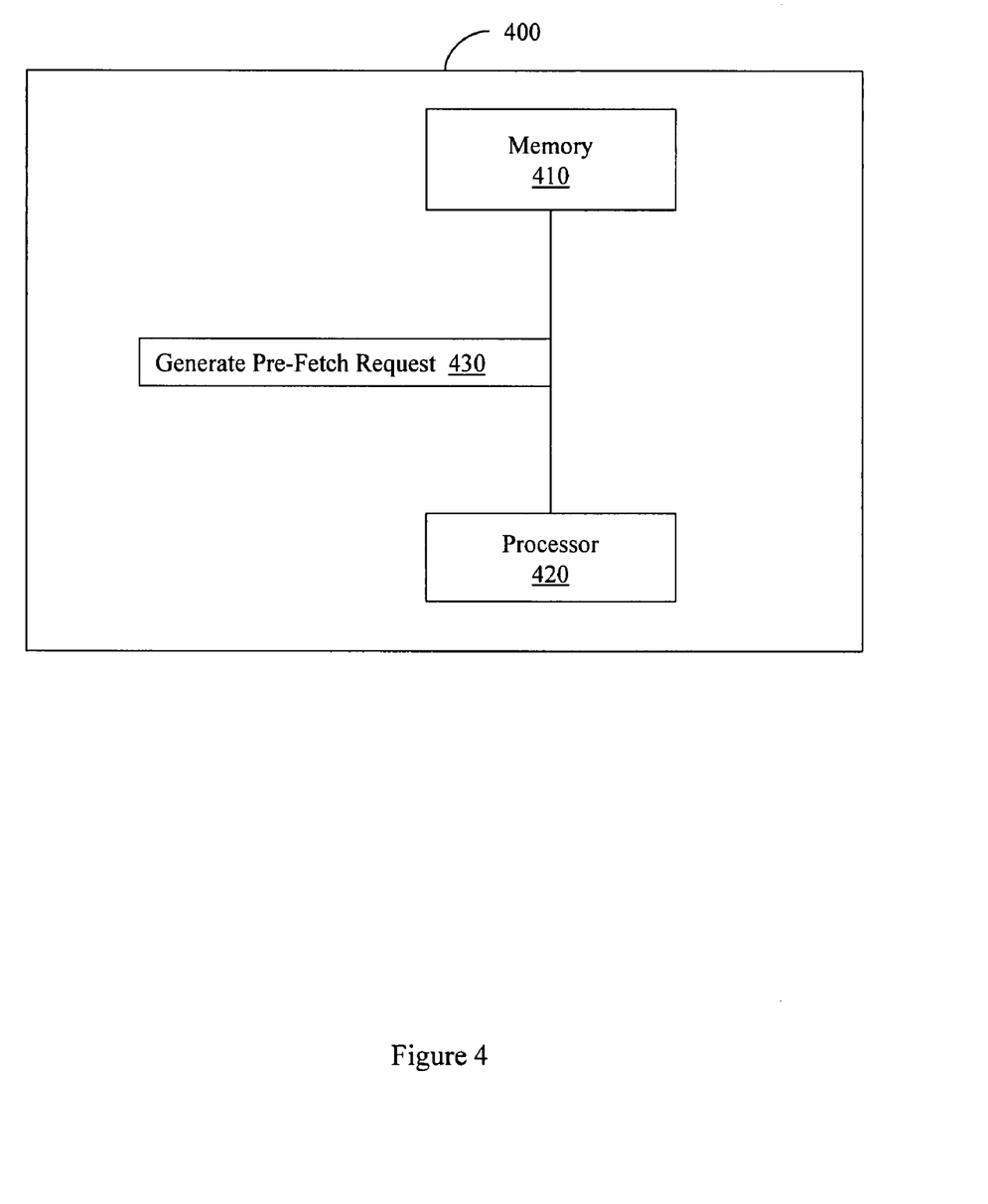
FIG. 4 is a block diagram illustrating a computing system in which at least some aspects of at least one embodiment of the invention may be performed.

FIG. 4 illustrates a computer system 400. The computer system 400 includes a memory 410. Memory 410 may store, for example, configuration parameters for IPP pre-fetch request generation 430. The configuration parameters may be used, for example, to turn on and/or turn off IPP pre-fetching, to cause the initialization and/or re-initialization of data structures, fields, values, and so on associated with IPP pre-fetching, to turn on and/or turn off IPP/alternative prefetch duplicate resolution, and so on. The computer system 400 may also include a processor 420. Processor 420 may generate pre-fetch requests according to configuration parameters 430. The processor 420 may include memory 410 and may include different units.

In one embodiment, the processor 420 may include a first unit to store data corresponding to an executed load instruction and an IP value associated with the executed load instruction. This first unit may store load instruction data on a per instruction basis. The processor 420 may also include a second unit to predict addresses for load instructions. The prediction may be based on a constant stride value that is computed from data stored in the first unit. The processor 420 may also include a third unit to generate an IPP request based on the predicted address.

A load may produce both an IPP request and an alternative pre-fetch address. Thus, in one embodiment, the processor 420 may include a fourth unit to generate an alternative pre-fetch request and a fifth unit to select between related IPP requests and alternative pre-fetch requests. The related IPP requests and alternative pre-fetch requests may have been generated in response to the same load instruction. Thus, in one embodiment, the fifth unit may control placement of IPP requests or alternative pre-fetch requests in a pre-fetch data store (FIFO).

"Logic", as used herein, includes but is not limited to hardware, firmware, machine executable instruction and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on.

"Signal", as used herein, includes but is not limited to, electrical signals, optical signals, analog signals, digital signals, or other means that can be received, transmitted and/or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A processor comprising:
   one or more processing cores,
   cache memory coupled to the one or more processing cores, and
   a processing logic coupled to the one or more processing cores and the cache memory, wherein the processing logic further comprises,
      a first unit to store data corresponding to executed load instructions, wherein the data to be stored in the first unit is to be indexed according to the instruction pointer (IP) values associated with the executed load instructions;
      a second unit to produce a predicted address for a next load instruction, wherein the predicted address is to be based, at least in part, on a constant stride value that depends, at least in part of, on target address differences between executed load instructions; and
      a third unit to generate an instruction pointer pre-fetch (IPP) request based, at least in part, on the predicted address
   wherein the first unit is to store the data corresponding to the executed load instructions in an IP history array,
   wherein an entry in the IP history array comprises:
      a first field to store data corresponding to a last demand address;
      a second field to store data corresponding to a last stride value;
      a third field to store data corresponding to a linear address that facilitates avoiding pre-fetching across memory pages;
      a fourth field to store data to identify a state in a state machine; and
      a fifth field to store data corresponding to a last pre-fetched address that facilitates avoiding redundant pre-fetch requests.

2. The processor of claim 1, wherein the first unit is to store the data including a demand address value and a stride value in an IP value indexed history array on a per load instruction basis.

3. The processor of claim 1,
   the first field having twelve bits;
   the second field having thirteen bits, twelve bits corresponding to a stride value and one bit corresponding to a stride value sign;
   the third field value having three bits;
   the fourth field value having two bits; and
   the fifth field value having six bits, and where an index to the IP value indexed history array is determined based on one or more of, the eight least bits of an IP value, and an hash function of an IP value.

4. The processor of claim 2, an entry in the IP history array comprising data to identify a state associated with a state machine having four states, the four states comprising:
   a reset state, the reset state being a beginning state for the state machine and a state where a first load will update an entry in the IP history array;
   an initial state where a stride between an executed load instruction and a load instruction to be executed is to be calculated upon detecting a load instruction whose IP value matches the IP value of an entry in the IP history array;
   a first predict state where a pre-fetch request for an address corresponding to a current demand address plus a stride value is to be generated upon detecting a load instruction whose IP value matches the IP value of an entry in the IP history array and upon detecting a stride hit between a new access and an old access, data corresponding to the old access is stored in the IP history array; and
   a second predict state where a pre-fetch request for an address corresponding to a current demand address plus a stride value is to be generated upon detecting a load instruction whose IP value matches the IP value of an entry in the IP history array and upon detecting a stride hit between a new access and an old access, old stride and the address corresponding to the last access being stored in the IP history array.

5. The processor of claim 4,
   where a transition from the reset state to the initial state is to occur upon identifying a first load instruction while the state machine is in the reset state;
   where a transition from the initial state to the first predict state is to occur upon identifying a match between an IP value associated with a load instruction and an IP value in the IP history array while the state machine is in the initial state;
   where a transition from the first predict state to the second predict state is to occur upon identifying a first stride miss while the state machine is in the first predict state;
   where a transition from the second predict state to the first predict state is to occur upon identifying a stride match while the state machine is in the second predict state; and
   where a transition from the second predict state to the initial state is to occur upon identifying a second stride miss while the state machine is in the second predict state.

6. The processor of claim 1, wherein the processor is a multi-core architecture processor.

7. The processor of claim 1, comprising:
a fourth unit to generate an alternative pre-fetch request; and
a fifth unit to select between an IPP request and an alternative pre-fetch request generated in response to the same load instruction, the fifth unit to control placement of IPP requests and alternative pre-fetch requests in a pre-fetch data store.

8. The processor of claim 7, where an IPP request associated with a first load instruction is to traverse an IPP request pipe in a first period of time to reach the fifth unit at a first point in time, and where an alternative pre-fetch request associated with the first load instruction is to traverse an alternative pre-fetch request in a second period of time to also reach the fifth unit at the first point in time.

9. The processor of claim 7, where when presented with both an IPP request and an alternative request associated with the same load instruction, the fifth unit is to preserve the IPP request and to discard the alternative request.

10. The processor of claim 7, where the fifth unit is to provide a preserved pre-fetch request to a pre-fetch data store that includes a unit to identify a duplicate pre-fetch request in a set of pre-fetch requests and to cancel the duplicate pre-fetch request.

11. The processor of claim 10, where the unit to identify is to compare ten least significant bits of a pre-fetch address associated with the pre-fetch request to pre-fetch addresses stored in the pre-fetch data store to identify duplicates.

12. A computer system to handle perfecting, comprising:
a memory to store an IPP pre-fetch configuration parameter; and
a processor to generate a pre-fetch request according to the configuration parameter, the processor comprising:
  a first unit to store data corresponding to an executed load instruction and an instruction pointer (IP) value associated with the executed load instruction;
  a second unit to produce a predicted address for a next load instruction, where the predicted address is based, at least in part, on a constant stride value that depends, at least in part, on target address value differences between executed load instructions; and
  a third unit to generate an instruction pointer pre-fetch (IPP) request based on the predicted address,
wherein the first unit is to store the data corresponding to the executed load instructions in an IP history array,
wherein an entry in the IP history array comprises:
  a first field to store data corresponding to a last demand address;
  a second field to store data corresponding to a last stride value;
  a third field to store data corresponding to a linear address that facilitates avoiding pre-fetching across memory pages;
  a fourth field to store data to identify a state in a state machine; and
  a fifth field to store data corresponding to a last pre-fetched address that facilitates avoiding redundant pre-fetch requests.

13. The computer system of claim 12, including:
a fourth unit to generate an alternative pre-fetch request; and
a fifth unit to select between an IPP request and an alternative pre-fetch request generated in response to the same load instruction, the fifth unit to control placement of IPP requests and alternative pre-fetch requests in a pre-fetch data store.

14. The computer system of claim 13, wherein
the first field comprises twelve bits to store data corresponding to a last demand address;
the second field comprises thirteen bits to store data corresponding to a stride value and a stride sign;
the third field comprises three bits to store data corresponding to a linear address that facilitates avoiding pre-fetching across memory pages;
the fourth field comprises two bits to store data to identify a state in a state machine; and
the fifth field comprises six bits to store data corresponding to a last pre-fetched address that facilitates avoiding redundant pre-fetch requests;
where the IP history array data corresponding to an executed load instruction indexed by IP value associated with an executed load instruction comprises eight bits of an IP, the eight bits being the eight least significant bits of an IP or hash function;
an entry in the IP history array comprising data to identify a state in a state machine having four states, the four states comprising:
a reset state, the reset state being a beginning state for the state machine and a state where a first load will update an entry in the IP history array;
an initial state where a stride between an executed load instruction and a load instruction to be executed is to be calculated upon detecting a load instruction whose IP value matches the IP value of an entry in the IP history array;
  a first predict state where a pre-fetch request for an address corresponding to a current address plus a stride value is to be generated upon detecting a load instruction whose IP value matches the IP value of an entry in the IP history array and upon detecting a stride hit between a new access and an old access, data corresponding to the old access being stored in the IP history array; and
  a second predict state where a pre-fetch request for an address corresponding to a current address plus a stride value is to be generated upon detecting a load instruction whose IP value matches the IP value of an entry in the IP history array, and upon detecting a stride hit between a new access and an old access, data corresponding to the old access being stored in the IP history array;
where a transition from the reset state to the initial state is to occur upon identifying a first load instruction while the state machine is in the reset state;
where a transition from the initial state to the first predict state is to occur upon identifying a match between an IP value associated with a load instruction and an IP value in the IP history array while the state machine is in the initial state;
where a transition from the first predict state to the second predict state is to occur upon identifying a first stride miss while the state machine is in the first predict state;
where a transition from the second predict state to the first predict state is to occur upon identifying a stride match while the state machine is in the second predict state; and
where a transition from the second predict state to the initial state is to occur upon identifying a second stride miss while the state machine is in the second predict state;
where an IPP request associated with a first load instruction is to traverse an IPP request pipe in a first period of time to reach the fifth unit at a first point in time, and where an alternative pre-fetch request associated with the first load instruction is to traverse an alternative pre-fetch request in a second period of time to also reach the fifth unit at the first point in time;

where when presented with both an IPP request and an alternative request associated with the same load instruction, the fifth unit is to preserve the IPP request and to discard the alternative pre-fetch request; and where the fifth unit is to provide the preserved pre-fetch request to a pre-fetch data store that includes a unit to identify a duplicate pre-fetch request in a set of pre-fetch requests and to cancel the duplicate pre-fetch request.

* * * * *